United States Patent [19]

Huber

[11] Patent Number: 5,749,543
[45] Date of Patent: May 12, 1998

[54] METHOD AND APPARATUS FOR CONTROLLING CARGO IN AN AIRCRAFT

[75] Inventor: Thomas Huber, Iffeldorf, Germany

[73] Assignee: Telair International Cargo Systems GmbH, Germany

[21] Appl. No.: 511,247

[22] Filed: Feb. 8, 1996

[51] Int. Cl.[6] .................... B64C 01/20; B65G 43/02; B65G 13/06; B65G 47/51
[52] U.S. Cl. .................... 244/118.1; 244/137.1; 198/781.01; 198/358
[58] Field of Search .................... 244/118.1, 137.1, 244/781.01, 781.05, 573, 502.3, 358

[56] References Cited

U.S. PATENT DOCUMENTS

| | | | |
|---|---|---|---|
| 3,513,960 | 5/1970 | Adams | 198/781.05 |
| 3,667,589 | 6/1972 | Constable | 198/781.01 |
| 4,013,161 | 3/1977 | Nelson | 198/781.05 |
| 4,225,926 | 9/1980 | Wendt | 244/137.1 |
| 4,593,810 | 6/1986 | Cook | 198/781.01 |
| 5,186,417 | 2/1993 | Pritchard | 244/137.1 |
| 5,213,201 | 5/1993 | Huber et al. | 244/137.1 |
| 5,335,777 | 8/1994 | Murphy et al. | 198/502.3 |
| 5,460,257 | 10/1995 | Yoshida | 198/358 |
| 5,568,858 | 10/1996 | Thompson | 244/137.1 |

FOREIGN PATENT DOCUMENTS

| | | |
|---|---|---|
| 0512672A1 | 11/1992 | European Pat. Off. . |
| 2162042B2 | 4/1976 | Germany . |
| 2908400A1 | 9/1980 | Germany . |
| 4200985A1 | 8/1992 | Germany . |
| 4136972A1 | 5/1993 | Germany . |
| 2043584 | 3/1979 | United Kingdom . |
| 2128955 | 5/1984 | United Kingdom . |

Primary Examiner—Virna Lissi Mojica
Attorney, Agent, or Firm—Howard & Howard

[57] ABSTRACT

Loading apparatus for loading containers into a cargo area in an aircraft are known that comprise, in addition to undriven conveyor rollers, a plurality of roller drive units. Each of the roller drive units includes a controllable drive motor to rotate drive rollers in a predetermined direction. In such loading systems, if the operator is inattentive it can happen that the roller drive units continue to run under containers that have been latched in place, so that the surface of their drive rollers and/or the drive motors are damaged. It is proposed to provide control leads between the roller drive units with control means in the control leads and/or in the roller drive units. The control means are connected to sensors and the roller drive units in such a way that during a transport process the drive motor of a roller drive unit is only turned on if the sensor detects the presence of a container in the region of action of the drive roller and if, prior to the detection of the container in the region of action of the drive roller of this roller drive unit, no other container has been sensed in the region of action of the drive roller of the adjacent roller drive unit next to it in the direction of transport.

5 Claims, 3 Drawing Sheets

METHOD AND APPARATUS FOR CONTROLLING CARGO IN AN AIRCRAFT

FIELD OF THE INVENTION

The present invention relates to, a method and apparatus for loading and unloading a cargo area in an aircraft.

DESCRIPTION OF THE PRIOR ART

An aircraft is conventionally loaded with freight by moving containers into the cargo area along roller conveyor tracks. The roller conveyor tracks comprise freely turning rollers as well as roller drive units which are spaced sufficiently close together that during the transport process a container is always within the region of action of the drive roller of at least one roller drive unit. As loading proceeds, when a first container has reached the back end of the cargo area, the roller drive unit below it must be switched off if the drive roller is to be prevented from rotating against the container, which would considerably shorten the useful life of the roller drive unit. Similarly, when a drive roller rotates against a container or is halted because the container has become stuck or the weight to be moved up through a sloping cargo area is too great, the motor associated with that roller drive unit must be turned off. This should in principle be the responsibility of the people operating the system, but experience has shown that very little reliance can be placed on the operators, both because of the time pressure normally encountered during loading and because the personnel are constantly changing. As a result, roller drive units are very frequently damaged.

SUMMARY OF THE INVENTION

The object of the present invention is to provide a method and an apparatus for loading and unloading a cargo area in an aircraft which compared with conventional apparatus saves wear on the roller drive units to provide them with a longer useful life.

According to a first aspect of the present invention there is provided a method of loading and unloading a cargo area in an aircraft wherein containers are transported in the cargo area by means of a plurality of roller drive units that are controlled by a manual switch, wherein the improvement comprises the provision of sensor means for each roller drive unit which means are each used to detect the presence of a container over its associated roller drive unit, and control means connected to said sensor means to determine whether said container is in its final loaded position and to inactivate those roller drive units for which this is the case independently of the operation of the manual switch.

According to a second aspect of the present invention there is provided loading apparatus for loading and unloading a cargo area in an aircraft with containers, comprising a plurality of roller drive units, and a switch device to start and to stop a transport process via said roller drive units and to determine a transport direction, each of said roller drive units comprising a drive roller; a controllable drive motor to rotate the drive roller in a predetermined direction according to the transport direction; a lifting means, which during rotation of the drive roller, raises the drive roller from a retracted resting position, in which the drive roller would not contact the base of a container located on the roller drive unit, into a driving position, in which the drive roller can engage the base of said container; and a sensor means to detect the presence or absence of a container in the region of action of the drive roller; and wherein the improvement comprises the provision of a control means for each roller drive unit which is connected to the sensor means of said unit; and control leads connected between the control means of adjacent roller drive units; whereby during a transport process, the drive motor of a roller drive unit is only turned on when the sensor means associated with said drive unit detects the presence of a container in the region of action of the drive roller of said drive unit if prior to the detection of said container no other container has been detected in the region of action of the drive roller of the adjacent roller drive unit next in the direction of transport.

It will be appreciated that as the roller drive units are connected to one another, the sensor means that monitor how far loading of the cargo area has progressed can be used to inactivate those roller drive units that are no longer serving to move a container.

So that a loading process can be interrupted, preferably the control means of each roller drive unit is so constructed that said roller drive unit is put into an inactive state if, when a transport process is turned on, a container is detected within the region of action of the drive roller of said roller drive unit.

The switch device preferably comprises a hand-operated switch which, in the absence of manual force, returns to an "off" position so that the drive motors of all the roller drive units are switched off. In this way it is impossible for the roller drive units to run longer than necessary owing to the inattentiveness of an operator.

Preferably various safety devices are provided for the individual roller drive units. Among these is a thermal cut-out means, which detects the temperature of the roller drive unit or its drive motor by way of sensors and which inactivates the drive motor when the detected temperature exceeds a first predetermined value. The roller drive unit is not reactivated until the temperature has fallen below a second, lower predetermined value, which indicates that it has cooled off sufficiently.

A load cut-out means is also preferably provided, which detects the load acting on the drive roller of each roller drive unit and temporarily inactivates the drive motor of the roller drive unit for a first predetermined period of time if the unit has been operating for longer than a second predetermined period of time under a load that exceeds a predetermined level. Alternatively or additionally it is possible to monitor the operating cycles of each roller drive unit and to inactivate the unit if, when a predetermined load level is exceeded it has been turned on for more than a predetermined number of cycles within a predetermined period of time.

For the sensor means, testing means are preferably provided which monitor the functionality of the sensors. If a sensor becomes nonfunctional, its control mechanisms are then disabled in such a way that the drive motor can be switched on and off regardless of the presence or absence of a container, so that the system can be controlled entirely by hand as in a conventional apparatus.

In the following, an exemplary embodiment of the invention is described with reference to the accompanying drawings.

DESCRIPTION OF THE PREFERRED EMBODIMENTS

Figure 1:
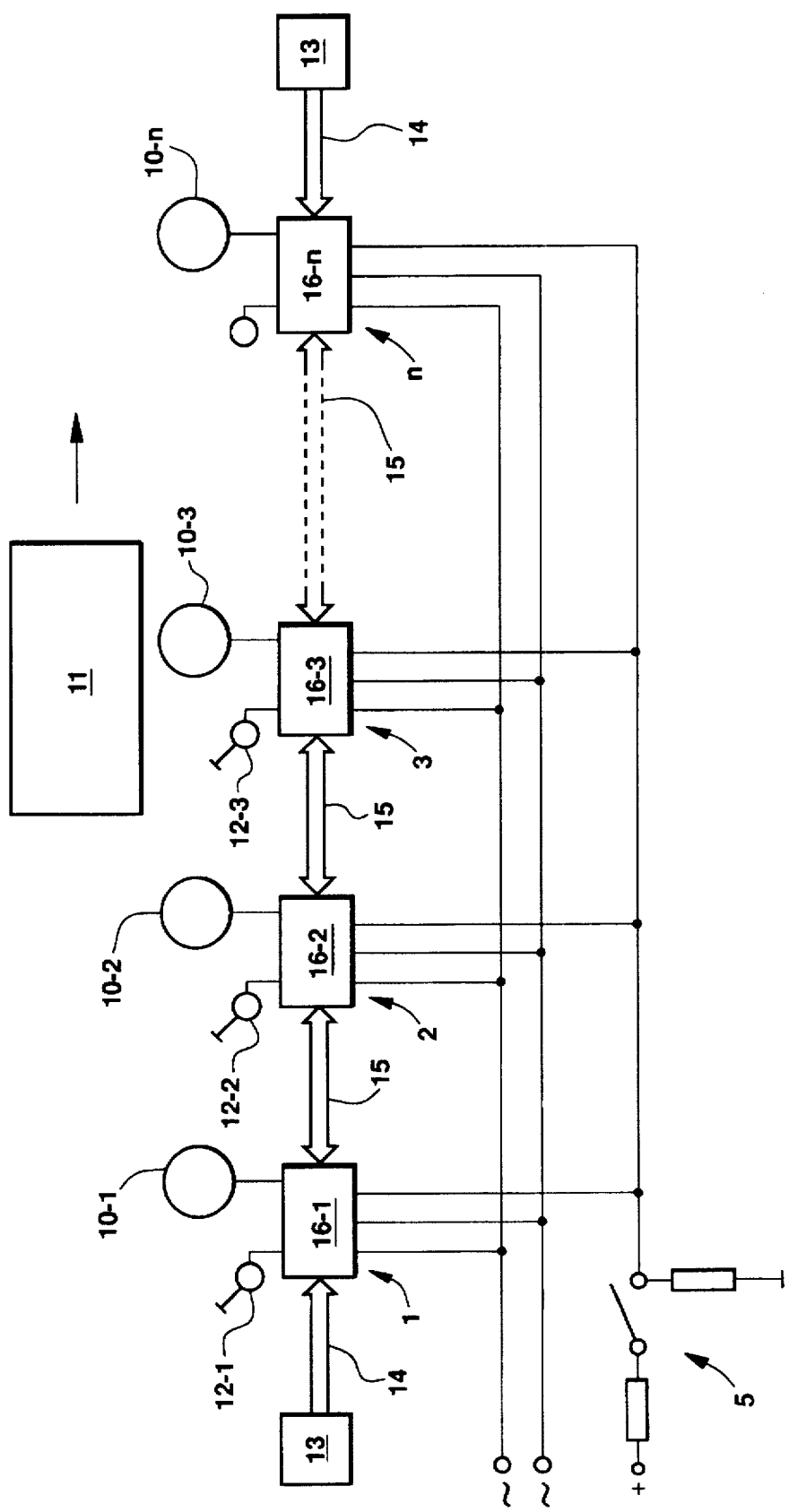
FIG. 1 is a block diagram of a loading apparatus according to the invention.

FIG. 1 shows schematically an embodiment of a loading apparatus in accordance with the invention that comprises a plurality of roller drive units 1, 2, 3 and n, which are disposed longitudinally in a cargo area and serve to transport containers into an aircraft and back out of it. Such arrangements are known and comprise unpowered rollers in addition to the roller drive units 1 to n, the latter being spaced so close together that a standard container is always in contact with at least one roller drive unit. The loading system additionally comprises roller drive units (not shown), which permit movement of the containers transverse to the longitudinal axis of the aircraft.

Each of the roller drive units 1 to n is provided with an electric motor 10-1, 10-2, 10-3, 10-n, which powers a drive roller (not shown). As soon as the motor 10-1 to 10-n is started, the drive roller is lifted in a known manner from a retracted resting position into a drive position, in which it is above the level of the unpowered rollers in such a way that its engages the base of a container located on the roller drive unit. An example of a roller drive unit of this kind is described in EP-391 175 A1.

The drive motors 10-1 to 10-n are controlled by control means 16-1, 16-2, 16-3 and 16-n, each of which receives input from a sensor means 12-1, 12-2, 12-3, 12-n. The sensor means 12-1 to 12-n preferably comprise, inter alia, optical sensors and are arranged in such a way that they signal when a container 11 lies over them or when such a container 11 has moved into a region of action of one of the drive rollers (not shown) of the roller drive units 1 to n.

All the control means 16-1 to 16-n are interconnected such that they both control and are controlled by one another, by way of control leads 15. In particular, by use of the control leads 15 it is signalled to each roller drive unit 2 to (n-1) whether the roller drive units adjacent to it, either in front of it or behind it with respect to the direction of transport of a container 11 (the direction of the arrow in FIG. 1), is operating or is turned off, and whether the corresponding sensor means is signalling the presence of a container. With respect to FIG. 1, that is whether the roller drive unit 1 or 3, and (n-2) or n, respectively is operating or is turned off, and whether the corresponding sensor means, 12-1 or 12-3, and 12-(n-2) or 12-n, respectively, is signalling the presence of a container. Furthermore, all control means 16-1 to 16-n are connected to a power-supply lead and also to a common control lead that runs to a hand-operated switch device 5. The switch device 5, which may comprise a joy-stick or lever, is so constructed that it sends out a signal for the conveyor assembly to operate only when it is held in an "on" position, and as soon as it is released, the switch device 5 is inactivated. For simplicity, the switch device 5 is shown here as determining only one direction of transport (the arrow in FIG. 1). In actuality, the switch device 5 is so constructed that depending on the direction in which the drive motors 10-1 to 10-n and the associated drive rollers of the roller drive units 1 to n are operating, it allows movement in either direction, so that containers can be transported into the cargo area of an aircraft and out of it.

Next to the control means at each end, 16-1 and 16-n, and connected to them by dummy control leads 14, are dummy roller drive units 13, each of which signals the presence of a container 11 in the region in which its drive roller, which is not actually present, would act.

Although not shown in FIG. 1, various safety devices can be provided for the individual roller drive units, as previously mentioned. A thermal cut-out means can be provided to monitor the temperature of the roller drive unit 1 to n, in particular its drive motor 10, and to inactivate the drive motor 10 if the detected temperature T exceeds a first predetermined value T1 and to activate the drive motor 10 when the temperature T subsequently falls below a second predetermined, lower value T2. A load cut-out means can also be provided to monitor the load acting on the drive roller and to inactivate temporarily the drive motor 10 if a predetermined load level has been present for a predetermined period of time and/or a predetermined number of activation cycles. A testing means can also be provided for the sensor means 12, which tests the functionality of the sensor means 12 and in case of a loss of function disables the control means 16 in such a way that the drive motor 10 of the associated roller drive unit 1 to n can be turned on and off independently of the presence or absence of a container 11.

The operation of the loading apparatus shown in FIG. 1 will now be described with reference to FIGS. 2A and 2B. This description specifically refers to the operation of the roller drive unit 2, and also takes into account the operating states of the roller drive units 1 and 3 and of their sensor means 12-1 and 12-3.

In a step S1 the status of the switch device 5, such as a joy-stick J, is checked. If the switch 5 is off, in a step S2 it is determined that the roller drive unit 2 should be turned off and the checking in step S1 is resumed.

If in step S1 the switch 5 is found to be on, in a subsequent step S3 the sensor means 12-3 of the next roller drive unit, in the direction of transport, is checked to determine whether it is signalling the presence of a container and whether a container 11 was present before the roller drive unit 2 was turned on. If this is the case, in a step S4 a check is made as to whether a container is present at the roller drive unit 2 and the associated sensor means 12-2 was signalling its presence before the second roller drive unit 2 was turned on. A "yes" answer means that when the system is turned on (S1; switch 5), a container is present both at the roller drive unit 3 and at the roller drive unit 2, and hence that the cargo area has already been loaded in this region. The system then proceeds to a step S5, in which the roller drive unit 2 is inactivated, and returns from there to step S1.

If the answer in step S3 is "no", this means that there was no container in the region of the third roller drive unit 3 when switch device 5 was turned on, and hence that the cargo area has not yet been loaded in this region. The system then proceeds to a step S6, in which it is determined whether the switch device 5 is still on and whether a container is simultaneously present in the region of the roller drive unit 2. If this is not the case, the checking in step S6 is repeated until the switch device 5 is found to be on.

Similarly, if the answer in step S4 is "no", the system likewise proceeds to step S6 and checks whether the switch device 5 is on and whether there is a container in the region of the roller drive unit 2.

Once a "yes" answer has been obtained in step S6, the checking continues in a step S7, to find out whether the temperature T of the roller drive unit 2 has exceeded a predetermined value T1. If it has, the roller drive unit 2 is turned off in a step S8. The system then returns to step S7, in which the temperature check is carried out. This cycle is repeated until the answer in step S7 is "no", i.e. the affected roller drive unit 2 is at a temperature lower than or equal to a predetermined critical temperature T1. When the answer in step S7 is "no", the system proceeds to a step S9, in which it is determined whether the temperature T of the roller drive unit 2 has fallen below a second, lower value T2. As long as this is not the case (a "no" answer in step S9), this check is repeated. By this means it is ensured that a roller drive unit turned off in step S8 is not turned on again until the temperature has fallen appreciably below the critical temperature T1.

If the answer in step S9 is "yes", in a step S10 the affected roller drive unit 2 is turned on. The system then proceeds to a step 11.

In step S11 it is determined whether the current I flowing to the drive motor 10-2 exceeds a limiting value I0 during a predetermined time span T0. If this is the case, the roller drive unit 2 is turned off in a step S12. It remains off until the switch device 5 is turned off, or where appropriate until the switch device 5 has been off for a predetermined length of time.

If the answer in step S11 is "yes", the system proceeds to a step S13, in which it is determined whether the roller drive unit 2 is under an excessive load. If this is the case (a "yes" answer), the system returns to step S7. If not, the system goes to step S6.

From the above description of the method in accordance with the invention it can be seen that no roller drive unit can be activated for loading if, when the transport process is turned on or started, a container is already present in the region of the next roller drive unit. Thus, a roller drive unit cannot continue to operate beneath a container that has been latched in its final position.

Figure 2A:
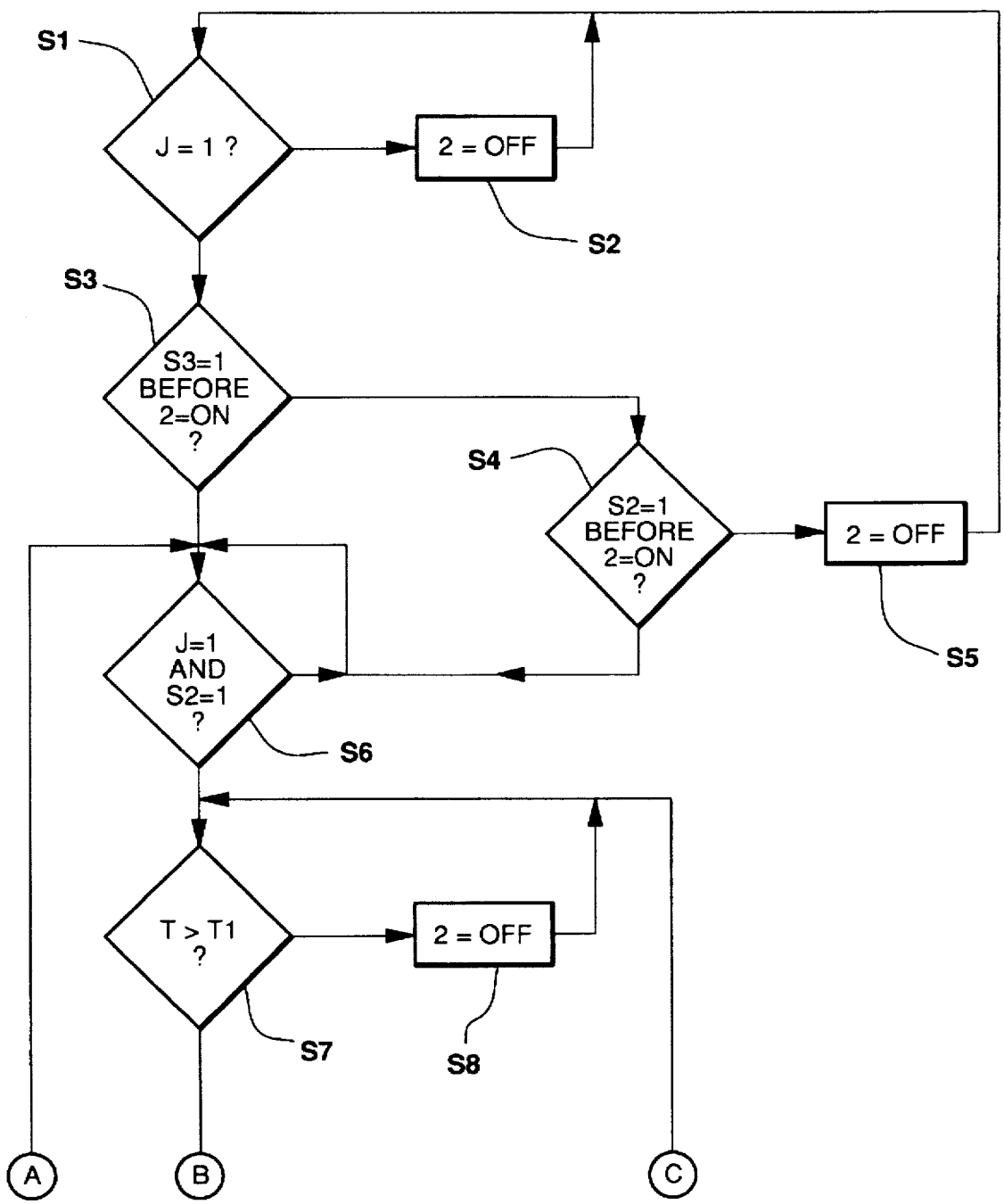
FIGS. 2A and 2B are flow diagrams to show the operation of the apparatus shown in FIG. 1 and to illustrate the method of the invention.
Figure 2B:
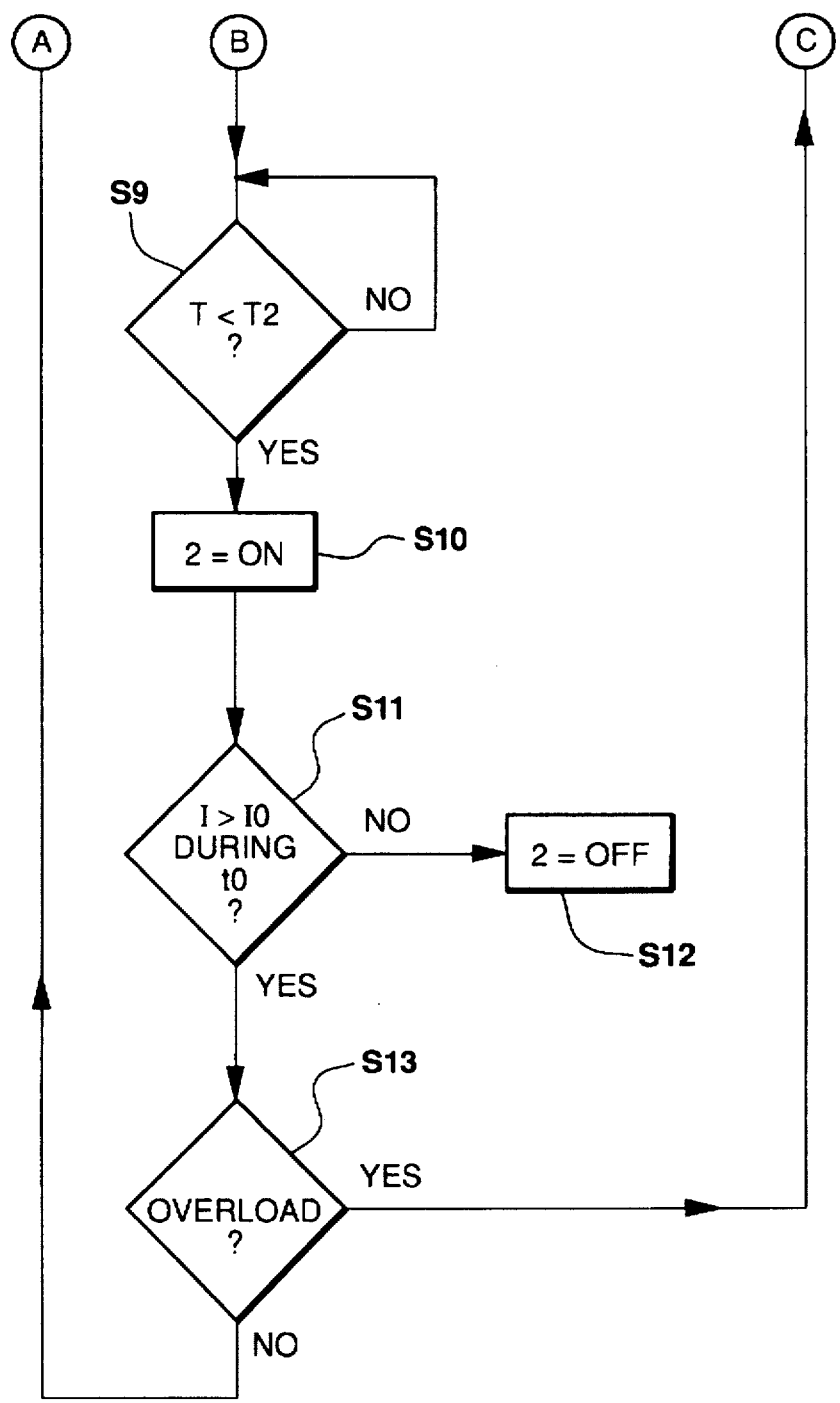

When the direction of transport is reversed (reversal of the arrow in FIG. 1), the procedure is again as shown in FIGS. 2A and 2B, except that the numbers identifying the roller drive units are reversed with respect to the example previously described. That is, the roller drive unit on the far left in FIG. 1 is now given the number 16-n and that on the far right in FIG. 1 is numbered 16-1.

What is claimed is:

1. Loading apparatus for loading and unloading a cargo area in an aircraft with containers, comprising:

a plurality of roller drive units;

a switch device to start and to stop a transport process via said roller drive units and to determine a transport direction;

each of said roller drive units comprising:

a drive roller;

a controllable drive motor to rotate the drive roller in a predetermined direction according to the transport direction;

a sensor means for each roller drive unit to detect the presence or absence of a container in the region of action of said drive roller thereof;

a control means for each roller drive unit, said control means connected to said sensor means of said roller drive unit;

control leads connected between said control means of adjacent roller drive units;

each sensor means including a testing means which tests the functionality of its associated sensor means and, in the case of a loss of function of the sensor means, disables said control means in such a way that the drive motor of the associated roller drive unit can be turned on and off independently of the presence or absence of a container in the region of action of the drive roller of that drive unit; and whereby during a transport process, the drive motor of one of said roller drive units is only turned on when the sensor means associated with said drive unit detects the presence of a container in the region of action of the drive roller of said drive unit in the absence of the detection of another container prior to the detection of said container in the region of action of the drive roller of the next adjacent roller drive unit in the direction of transport.

2. Loading apparatus as claimed in claim 1, wherein said switch device comprises a hand-operated switch which, in the absence of manual force, returns to an "off" position so that the drive motors of all the roller drive units are switched off.

3. Loading apparatus as claimed in claim 1, wherein the control means of each roller drive unit is so constructed that said roller drive unit is put into an inactive state if, when a transport process is turned on, a container is detected within the region of action of the drive roller of said roller drive unit.

4. Loading apparatus as claimed in claim 1, wherein each roller drive unit comprises a thermal cut-out means which monitors the temperature of the drive motor of its associated roller drive unit and which can operate to inactivate said drive motor if its temperature exceeds a first predetermined value and thereafter to activate the drive motor if its temperature subsequently falls below a second predetermined value lower than said first predetermined value.

5. Loading apparatus as claimed in claim 1, wherein each roller drive unit comprises a load cut-out means which monitors the load acting on the drive roller of its associated roller drive unit and which can operate to inactivate temporarily the drive motor of said unit if a predetermined load level has been detected for at least one of a predetermined period of time and a predetermined number of activation cycles.

* * * * *